(12) United States Patent
Williams

(10) Patent No.: US 6,481,193 B2
(45) Date of Patent: Nov. 19, 2002

(54) WATER STREAM FOLIAGE CUTTER

(75) Inventor: Anthony J. Williams, Canton, OH (US)

(73) Assignee: MTD Products Inc., Cleveland, OH (US)

( * ) Notice: Subject to any disclaimer, the term of this patent is extended or adjusted under 35 U.S.C. 154(b) by 12 days.

(21) Appl. No.: 09/733,139

(22) Filed: Dec. 8, 2000

(65) Prior Publication Data

US 2002/0069630 A1 Jun. 13, 2002

Related U.S. Application Data

(60) Provisional application No. 60/169,751, filed on Dec. 9, 1999.

(51) Int. Cl.[7] .............................................. A01D 34/00
(52) U.S. Cl. ........................................ 56/16.8; 56/12.7
(58) Field of Search .............................. 30/123.3, 347, 30/276; 56/12.7, 16.8, 12.1; 83/177; 239/104

(56) References Cited

U.S. PATENT DOCUMENTS

| 2,930,334 A | 3/1960 | Marron et al. |
| 3,252,249 A | 5/1966 | Propst |
| 3,330,070 A | 7/1967 | Ferm et al. |
| 3,779,461 A | 12/1973 | Paul ............................ 239/172 |
| 3,930,324 A | 1/1976 | Wightman et al. ............. 37/189 |
| 4,034,686 A | 7/1977 | Collins ........................... 111/7 |
| 4,300,461 A | 11/1981 | Hodge et al. .................... 111/6 |
| 4,481,894 A | 11/1984 | Brenn ............................ 111/6 |
| 4,662,163 A | 5/1987 | Adams .......................... 56/341 |
| 4,807,544 A | 2/1989 | Cross et al. ..................... 111/7 |
| 4,936,031 A | 6/1990 | Briggs et al. ................... 37/80 |
| 4,967,546 A * | 11/1990 | Forbush ........................ 56/255 |
| 5,007,803 A | 4/1991 | DiVito et al. ................. 417/137 |
| 5,016,717 A | 5/1991 | Simons et al. ................. 175/66 |
| 5,101,745 A | 4/1992 | Podevels et al. ............. 111/127 |
| 5,195,308 A | 3/1993 | Grote et al. ................... 56/16.4 |
| 5,201,638 A | 4/1993 | Bieri ............................ 417/234 |
| 5,295,317 A | 3/1994 | Perrott .......................... 37/348 |
| 5,394,812 A | 3/1995 | Dunning et al. ............. 111/127 |
| 5,460,106 A | 10/1995 | Crockett et al. ............. 111/127 |
| 5,487,346 A | 1/1996 | Taylor .......................... 111/127 |
| 5,503,091 A | 4/1996 | Foster et al. ................. 111/127 |
| 5,689,944 A | 11/1997 | Mirosevic ..................... 56/16.8 |
| 6,256,886 B1 * | 7/2001 | Legrand ..................... 30/123.3 |

FOREIGN PATENT DOCUMENTS

| DE | 93 00 077.4 | 1/1993 | |
| EP | 0 893 047 A1 | 7/1998 | |
| FR | 2 312 953 | 7/1976 | |
| FR | 7616904 | 12/1976 | .......... A01M/21/00 |
| GB | 2 093 327 A | 2/1982 | |

OTHER PUBLICATIONS

WO 93 09660 A issued May 1993.
Notification of Transmittal of ISR dated Oct. 18, 2001.
International Search Report

* cited by examiner

*Primary Examiner*—Robert E. Pezzuto
(74) *Attorney, Agent, or Firm*—Emerson & Skeriotis; Roger D. Emerson; Timothy D. Bennett

(57) ABSTRACT

There is provided a mower having a high pressure fluid pump powered by a mower engine and communicated to a fluid jet assembly. The pump receives associated fluid from a mower reservoir. An output fluid stream is discharged from a fluid jet under sufficient pressure to sever associated vegetation and impact upon a mower diffusing device.

14 Claims, 4 Drawing Sheets

WATER STREAM FOLIAGE CUTTER

This application claims benefit of provisional application 60/169,751, filed Dec. 9, 1999.

BACKGROUND OF THE INVENTION

1. Field of Invention

This invention relates to the art of vegetation mowers and more specifically to mowers cutting vegetation with a stream of high-pressure fluid.

2. Description of the Related Art

It is known to cut metal and other various rigid objects having a characteristic hardness. It is also known to provide a weeder and mulcher apparatus utilizing a plurality of fluid jets.

U.S. Pat. No. 5,689,944 discloses a fluid tank having a pair of fluid lines connected to a plurality of fluid jets. A pair of pumps is disclosed to provide pressurized fluid to flow through the fluid jets for use in severing weeds. The pressurized fluid is impacted upon the associated ground.

U.S. Pat. No. 3,252,249 discloses an invention for thinning plants from a crop row. The patent further discloses a pair of jets discharging high pressure water through two jets such that the jet streams intersect each other underneath the surface of the earth to cut the plants.

One aspect of the aforementioned inventions is that the fluid stream impacts the associated ground. What is needed is a fluid jet vegetation cutter that discharges a pressurized fluid stream parallel to the associated ground that impacts upon a diffusing material after severing turf via impact with the high pressurized fluid streams.

SUMMARY OF THE INVENTION

One objective of the present invention is to provide a fluid jet vegetation cutter.

It is another object of the present invention to discharge an output fluid stream parallel to the associated ground for use in severing associated vegetation.

It is yet another object of the present invention to provide a pressurized output fluid stream in the range of 2,000 to 40,000 psi.

It is still yet another object of the present invention to provide a mower deck with a diffusing means.

It is yet another object of the present invention to provide a mower having fluid jets rotatably received by a mower deck.

It is still another object of the present invention to provide a plurality of fluid jets spaced vertically apart for use in mulching associated vegetation.

According to the present there is provided a mower having a high pressure fluid pump powered by a mower engine and conmmunicated to a fluid jet assembly. The pump receives associated fluid from a mower reservoir. An output fluid stream is discharged from a fluid jet under sufficient pressure to sever associated vegetation and impact upon a mower diffusing means.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE EMBODIMENTS

Figure 1:
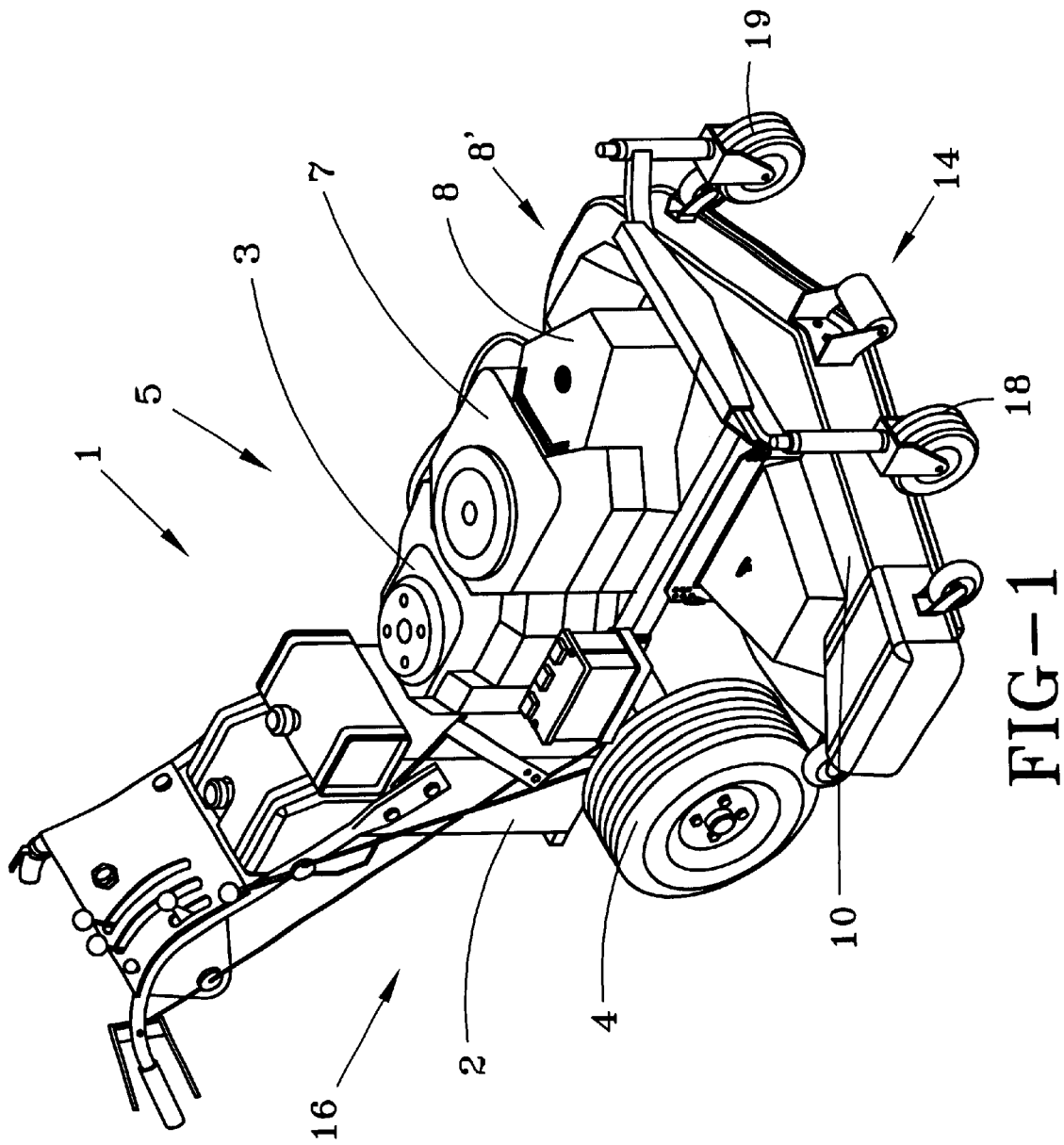
FIG. 1 is a perspective view of a vegetation mower having a fluid pump and reservoir.

Referring now to the drawings wherein the showings are for purposes of illustrating a preferred embodiment of the invention only and not for purposes of limiting the same, FIG. 1 shows a vegetation mower 1 according to this invention. The embodiment described herein is directed to a vegetation mower but the invention is applicable to other types of cutting devices such as foliage trimmers, tree cutters, and the like. The vegetation mower 1 includes a frame 2 having front and back portions 14, 16 with front wheels 18, 19 operatively mounted to the front portion 14 and back wheels 4, 5 operatively mounted to the back portion 16. The mower includes an engine 3 that is fixedly mounted to the frame 2. The engine 3 may provide power to drive the wheels, which in the preferred embodiment drives the back wheels 5, 6. In another embodiment, the mower 1 may include an alternator, not shown, to provide electrical power to various mower devices such as a mower deck fan 80 or blades, shown in FIG. 3 and further discussed in a subsequent section. A fluid pumping mechanism or pump 7 is also received by the frame 2, which will likewise further disclosed in a subsequent paragraph.

With continuing reference to FIG. 1, the fluid pump 7 is a high-pressure pump that provides a first pressurized fluid output. High pressure refers to fluid pressure above atmospheric pressure. In the preferred embodiment, the fluid associated with the invention and the pump 7 is water. The fluid may contain additives such as a fertilizer, weed killer or the like provided such additives do not interfere with the normal operation of the pump 7 and associated equipment. Any fluid pump may be chosen with sound engineering judgment that is appropriate for providing sufficient pressure and flow to maintain normal operation of the present invention. In one embodiment, the pump 7 may have a suction input, not shown, that draws the fluid from a fluid supplying means 8. The invention may also be configured such that gravity assists in feeding the fluid from the fluid supplying means 8 to an input of the pump 7. In either embodiment, fluid is fed to the pump 7 from the fluid supplying means 8 by way of a hose. In the preferred embodiment the fluid supplying means 8 is a reservoir 8' that may contain a fixed volume of fluid. The fluid supplying means 8 may also be an external fluid supply, not shown, such as a water hose that feeds the pump 7 during operation of the invention.

Figure 2:
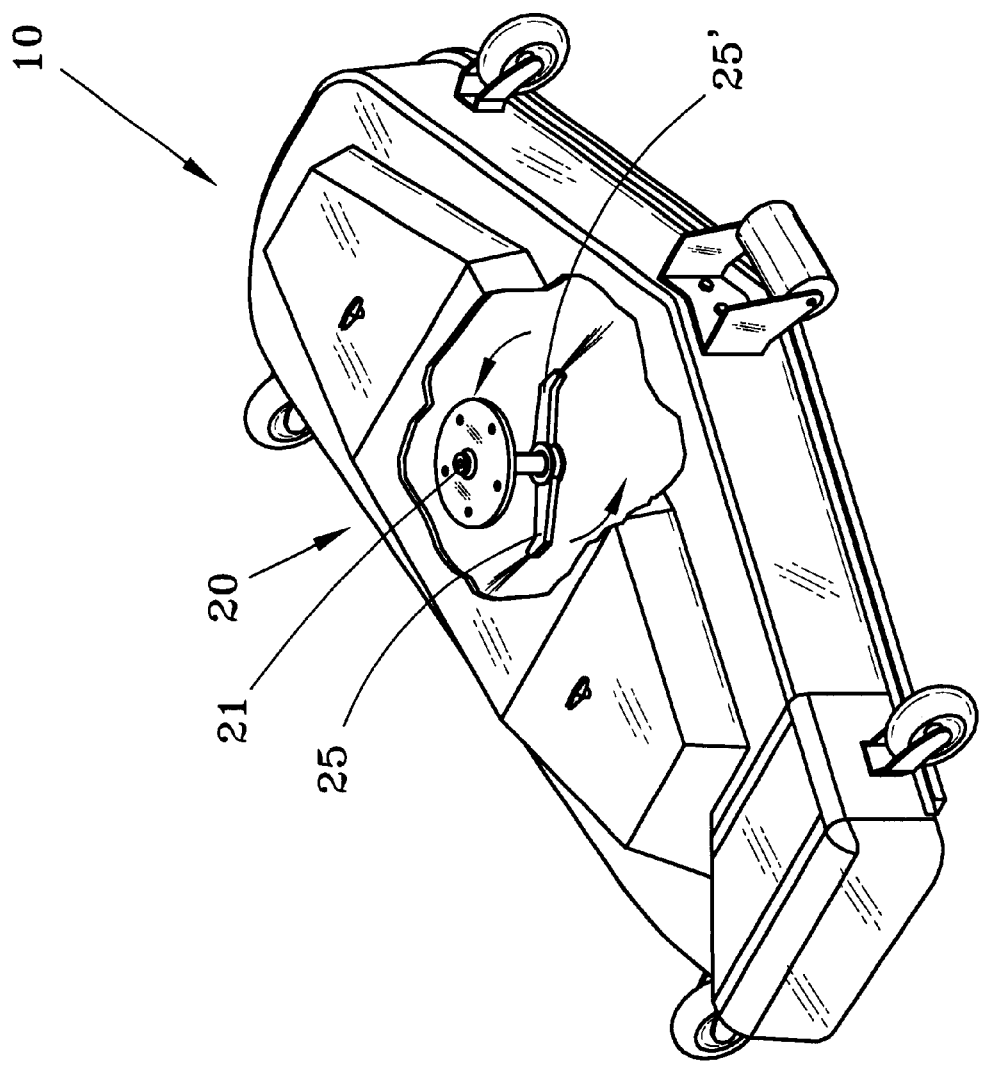
FIG. 2 is a cutaway perspective view of the mower deck showing the fluid jets.

With reference now to FIG. 2, the mower deck is shown generally at 10. A fluid jet assembly 20 is shown having first and second fluid jets 25, 25'. However, any number of fluid jets 25 may be incorporated into the present invention that is chosen with sound engineering judgment. The fluid jet assembly 20 has a first receiving portion 21 fashioned to receive a hose or other means of communicating pressurized fluid, not shown, and connector or clamp, also not shown, allowing communication of pressurized fluid from the first pressurized fluid output of the pump 7 to the fluid jet assembly 20. The fluid jet assembly 20 may have an attaching portion 22 for use in fixedly attaching the fluid jet assembly 20 to the mower deck 10. The fluid jet assembly 20 may also have a shaft portion 23 extending into the mower deck 10. The pressurized fluid from the pump 7 is communicated through the shaft portion 23 to an input of the fluid jets 25, 25'. In the preferred embodiment, the fluid jets 25, 25' are operatively attached to the shaft portion 23 and may be configured to swivel about a longitudinal axis. With continued reference to a singular fluid jet, fluid jet 25 has a first end. In one embodiment, during steady state operation of the fluid jet 25, an output fluid stream 26 is discharged from the first end of the fluid jet 25 at a predetermined pressure level. The output fluid stream 26 has an associated velocity due to the pressure level that has been amplified by the fluid jet 25. The fluid pressure within the fluid jet 25 may be substantially greater than the pressure of the fluid from the output of the pump 7. In that the physics of fluid jets are well known in the art no further explanation will be provided at this point.

Figure 3:
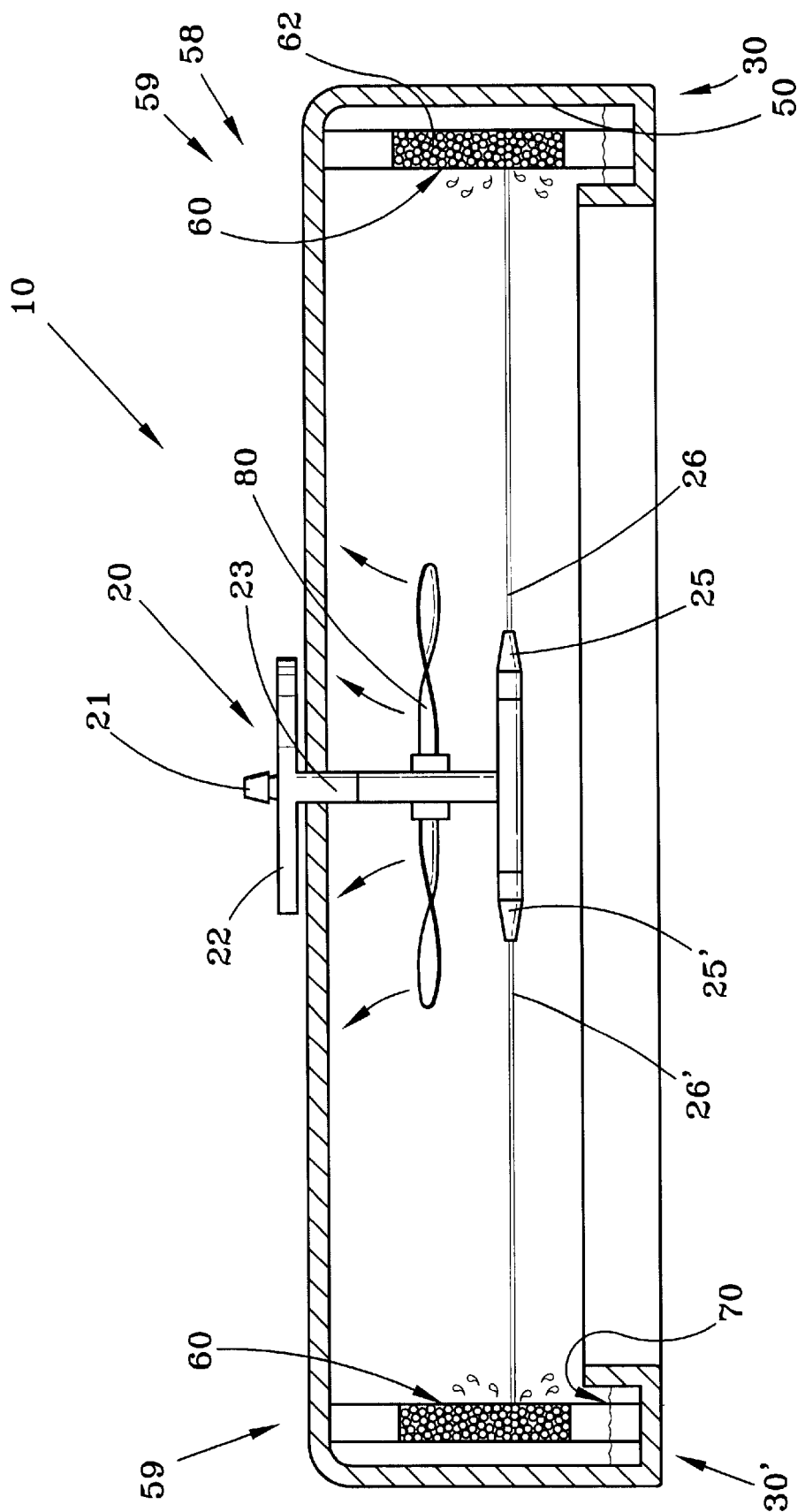
FIG. 3 is a cross sectional view of the mower deck showing the fluid jet and diffusing means.

With reference to FIGS. 2 and 3 and to a particular fluid jet, the first end of the fluid jet 25 may be curved or angled with reference to the longitudinal axis of the fluid jet 25 forming an angle A1. Additionally, the fluid jet 25 may be rotatably received by the fluid jet assembly 20. By rotatably received, it is meant that the fluid jet 25 may rotate radially about the fluid jet assembly 20. In one embodiment, the fluid jet 25 may rotate with respect to the shaft portion 23. In another embodiment, the fluid jet 25 may rotate with the shaft portion 23. In either embodiment, the fluid output stream discharged from the end of the fluid jet 25 has sufficient pressure to forcefully extend to a side portion 30, 30' of the mower deck 10. Therefore during rotation of the fluid jet 25, the fluid output stream spans a plane P1, which is contained within mower deck 10, having an area B1. Due to sufficient operating pressure, the output stream 26 is discharged substantially parallel with respect to the ground. The plane P1 is therefore also substantially parallel with respect to the ground. In the case where the ground is level with respect to a substantially horizontal plane, the output stream is also substantially horizontal.

With continued reference to FIGS. 2 and 3, the rotation of the fluid jet 25 will now be discussed. In one embodiment, the fluid jet 25 is rotatably received by shaft portion 23 via one or more bearings and is free to rotate thereabout. Rotation of the fluid jet 25 is facilitated by the equal and opposite reaction of the fluid jet 25 to the discharging of the output fluid stream from the end of the fluid jet 25. In that the first end of the fluid jet 25 may be angled with respect to a longitudinal axis of the fluid jet 25, the amount of force acting to rotate the fluid jet may be selectively predetermined. The first end of the fluid jet 25 may be fashioned at any angled chosen with sound engineering judgment. In that the physics of equal and opposite reactive forces are well known, no further discussion will be offered at this point. Thus, during flow of the output fluid stream, reactive forces act to rotate fluid jet 25 about the fluid jet assembly 20. In an alternate embodiment, an electromotive forcing means, not shown, may be included to facilitate rotation of the fluid jet 25 about the shaft portion 23 or the fluid jet assembly 20. The electromotive forcing means may be a small electric motor device, not shown or any such electro-magnetic device that facilitates rotational movement. An alternator, not shown, may be included and operatively communicated to the engine 3 for use in providing power to the motor or electro-motive forcing means.

A valve, not shown, may be included to selectively allow the pressurized fluid from the pump 7 to be communicated to the fluid jets 25, 25'. The valve may be any of valve type chosen with sound engineering judgment. In one embodiment, the valve is operatively disposed between the pump 7 and the fluid jet 25. In another embodiment, the pump 7 may be of the variable displacement type wherein selective adjustment of the pump 7 selectively communicates pressurized fluid to flow from the pump 7 to the fluid jets 25, 25'.

With continued reference to FIG. 3, a diffusing means 59 is included to diffuse the output fluid streams 26, 26'. By diffusing, it is meant that cutting or severing force of output fluid stream 26, 26' is absorbed by a barrier 58. The barrier 58 is circumferentially extended about an interior wall 50 of the mower deck 10. In this manner, the output fluid streams 26, 26', as they are rotated about the interior of the mower deck 10 will continuously impact the diffusing means 59 throughout normal operation of the mower 1 during the cutting process. The diffusing means 59 may be any diffuser chosen with sound engineering judgment. In one embodiment, the diffuser may be a plurality of relatively small hardened particles 62 held in close proximity by a surrounding fluid-permeable membrane 60. Sufficient space may be included within the volume defined by the membrane 60 to allow for movement of the particles during the impact of the output fluid streams 26, 26' thereupon. In this manner, force from the output fluid stream 26, 26' may be transferred to the particles preventing erosion or deterioration of the mower deck wall 50. In another embodiment, the diffusing means 59 may include a single rigid wall, not shown, manufactured from a sufficiently hardened material. The rigid wall, not shown, may be erected substantially perpendicular to output fluid stream 26, 26' for use in absorbing the impact force of the output fluid streams 26, 26'. Any material may be chosen with sound engineering judgment. In either embodiment, the defusing material may be selectively replaced.

With continued reference to FIG. 3, a trough 70 is fashioned at a lower end and within the mower deck 10 such that all or some of the fluid after impact with the diffusing means 59 is received into the trough for dispersion about the periphery of the mower deck. In this manner, the turf may be watered while being cut. It is noted that beneficial additives may be added to the fluid to improve the condition of the turf. In another embodiment, a pumping means, not shown, may pump the fluid back into the reservoir 8', which may be gather from the trough 70 at a predetermined location.

Figure 4:
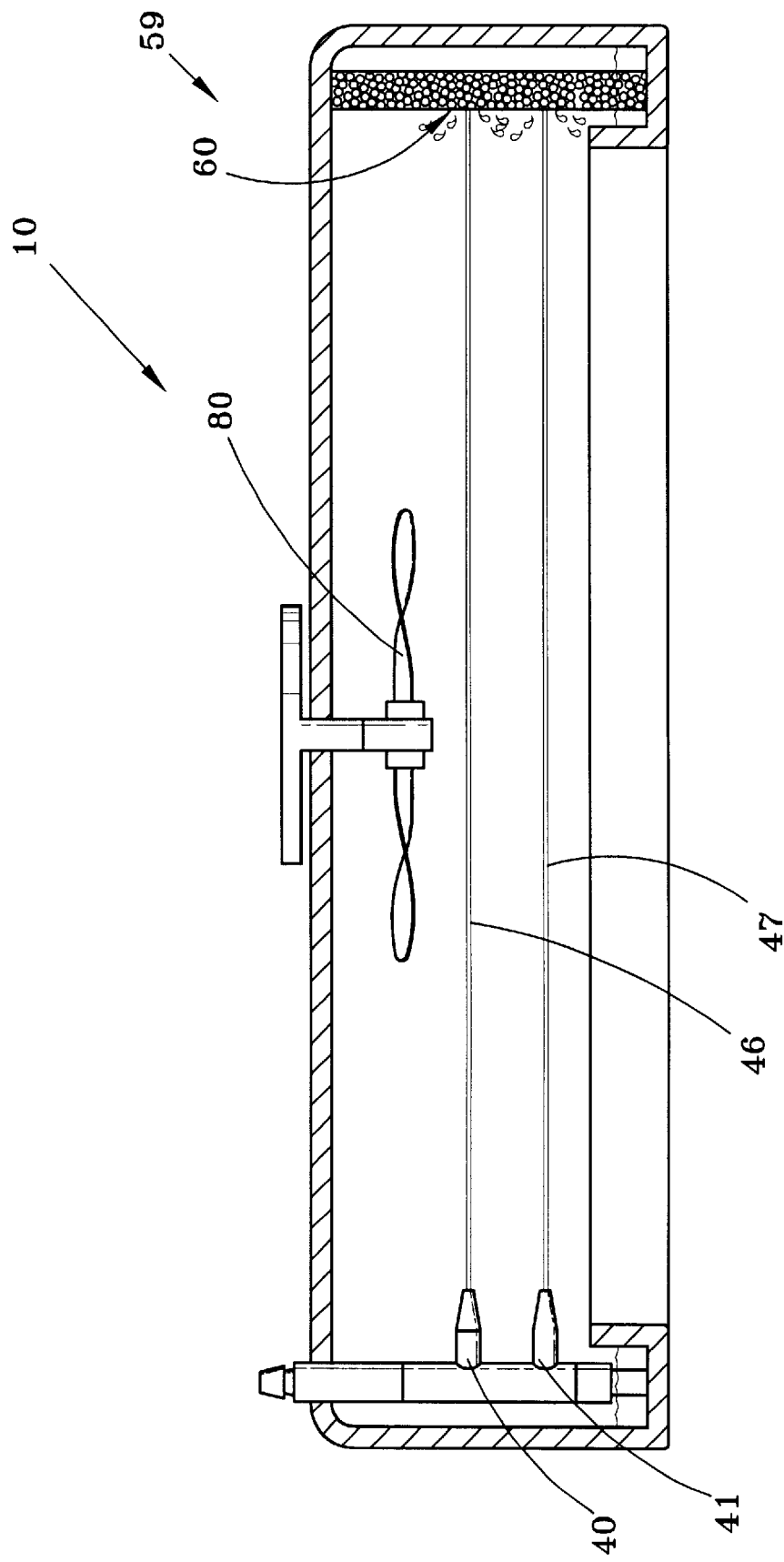
FIG. 4 is a cross sectional view of the mower deck showing an alternate embodiment of the fluid jet and diffusing means.

With reference now to FIG. 4, an alternate embodiment will now be discussed. The mower deck 10 may include two or more fluid jets 40, 41 disposed vertically apart by a distance D2. The fluid jets 40, 41 may be fixedly attached substantially at one side of the mower deck 10 or they may be rotatably attached to the shaft portion 23 similar to that as described in a previous embodiment. In this manner, the output fluid streams 46 and 47 span the distance of the mower deck 10 to impact the diffusing means 59. In that the fluid jets 40, 41 are spaced vertically apart, the output fluid streams 46, 47 sever the associated vegetation at a plurality of points along the length of vegetation. This functions to mulch the vegetation, which may be further enhanced by additives included in the fluid to promote decomposition of the severed vegetation.

With reference to FIGS. 3 and 4, a blade or fan 80 may be operatively attached to the shaft portion 23. The fan 80 is configured and mounted to rotate about a center axis creating an updraft within the mower deck 10. This upward flow of air functions to draw the vegetation or turf upward, longitudinally extending the turf for a consistent cut. The fan 80 may include electrical conductor coils that facilitate rotation about an axis when powered from electricity generated by the alternator, not shown. Alternately, rotation of the fan 80 may be facilitated by operatively communicating the fan 80 with the rotational momentum of the fluid jets 25, 25'.

With reference to FIGS. 1–4, operation of the present invention will now be discussed. During normal operation of the mower 1, the pump 7 is engaged to provide a pressurized fluid flow, which is selectively communicated to the fluid jet assembly 20 and subsequently to the fluid jets 25, 25'. Selective communication of the pressurized fluid flow may be facilitated by a valve, not shown, which prevents or allows fluid flow there through. The pressurized fluid is then directed through the fluid jets 25, 25' and is discharged from the first end thereof. As the output fluid streams 26, 26' extend toward the defusing means 59; the impact force of the fluid severs the vegetation. Rotation of the fan 80 causes air to flow upward within the mower deck 10, which longitudinally extends the vegetation for use in providing a consistent and level cut. The fluid jet assembly 20 may output fluid pressure in the range of 2,000 to 40,000 psi, as is sufficient for the cutting of the vegetation. The fluid is then received by a trough 70 for dispersion therefrom.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A mower, comprising:
   a frame;
   an engine operatively connected to said frame;
   at least two ground engaging wheels operatively connected to said frame:
   a mower deck operatively connected to said frame;
   a fluid pump operatively connected to said engine, said pump having at least a first pressurized fluid output;
   a fluid supplying means for supplying an associated fluid to said fluid pump;
   at least a first fluid jet received by said mower deck, said at least a first fluid jet operatively communicated to said at least a first pressurized fluid output, said at least a first fluid jet having at least a first fluid output stream that is pressurized with respect to atmospheric pressure for use in severing associated vegetation; and,
   a fluid difflusing means for difflusing said at least a first fluid output stream, wherein said diffusing means is a barrier adapted to absorb the output fluid stream.

2. The mower of claim 1, wherein the barrier extends 360 degrees around the interior of the mower deck.

3. The mower of claim 1, wherein said at least a first output stream is discharged substantially parallel with respect to the associated ground.

4. The mower of claim 1, wherein said fluid supplying means is a fluid reservoir operatively attached to frame.

5. The mower of claim 1, wherein said at least a first fluid jet and a second fluid jet are disposed at first and second cutting heights respectively.

6. The mower of claim 2, wherein the, output fluid stream continuously impacts the barrier during normal cutting operation of the mower.

7. The mower of claim 6, further comprising:
   a fluid collecting means for collecting fluid from said at least a first fluid output stream.

8. A mower, comprising:
   a frame;
   an engine operatively connected to said frame;
   at least two ground engaging wheels operatively connected to said frame:
   a mower deck operatively connected to said frame;
   a fluid pump operatively connected to said engine, said pump having at least a first pressurized fluid output;
   a fluid supplying means for supplying an associated fluid to said fluid pump;
   at least a first fluid jet rotatably received by said mower deck, said at least a first fluid jet operatively connected to said at least a first pressurized fluid output, said at least a first fluid jet having at least a first fluid output stream that is pressurized with respect to atmospheric pressure for use in severing associated vegetation.
   a fluid diffusing means for diffusing said at least a first fluid output stream.

9. The mower of claim 8, further comprising:
   a fan received by said mower deck, said fan powered by said engine.

10. The mower of claim 8, further comprising:
    a valve selectively communicating said at least a first pressurized fluid output to said at least a first fluid jet.

11. The mower of claim 10, wherein said fluid jet operatively rotates with respect to said mower deck while said valve is open.

12. The mower of claim 8, wherein the barrier extends 360 degrees around the interior of the mower deck.

13. The mower of claim 12, wherein the output fluid stream continuously impacts the barrier during normal cutting operation of the mower.

14. The mower of claim 13, further comprising:
    a fluid collecting means for collecting fluid from said at least a first fluid output.

* * * * *